Patented Feb. 24, 1953

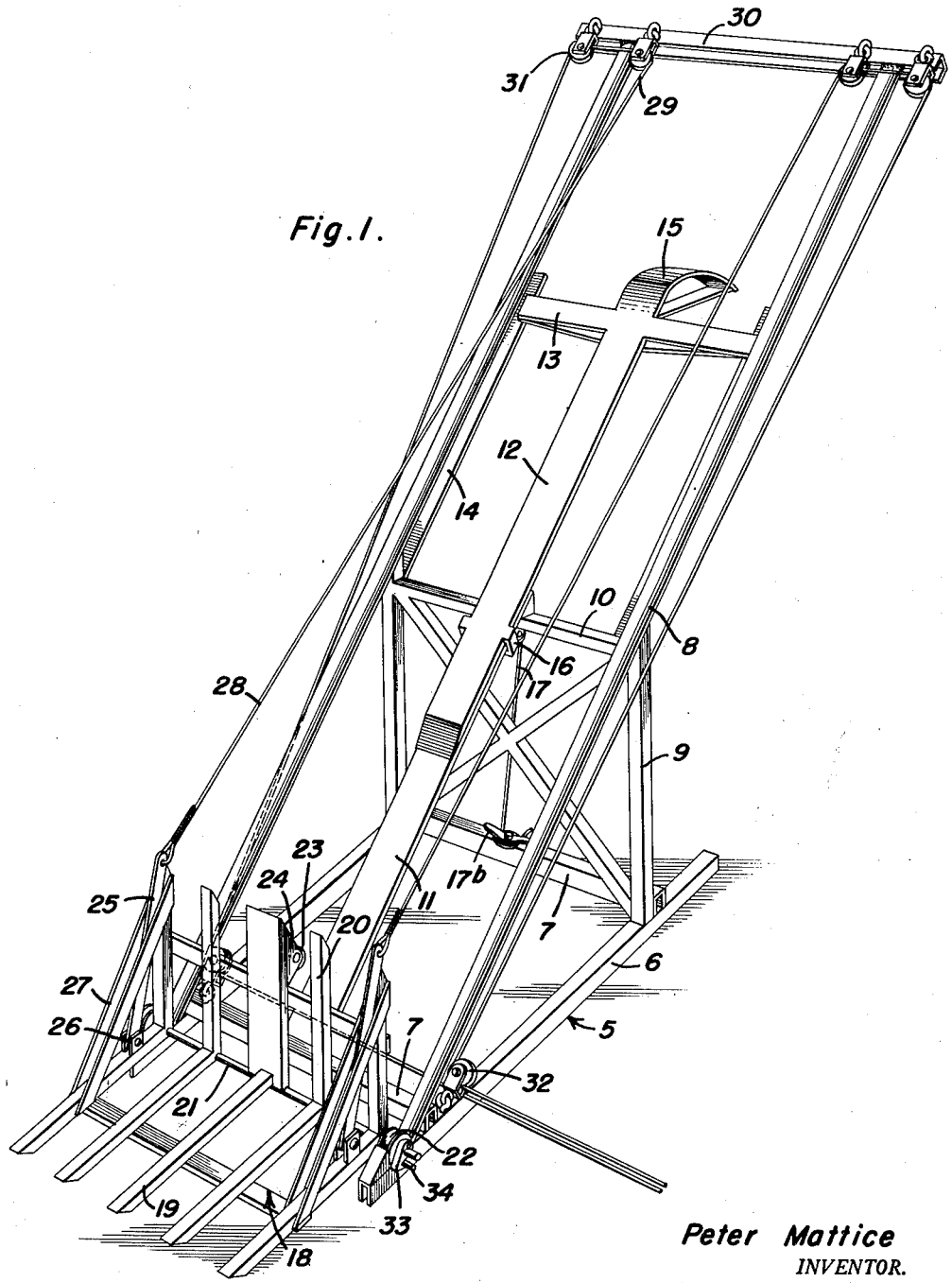

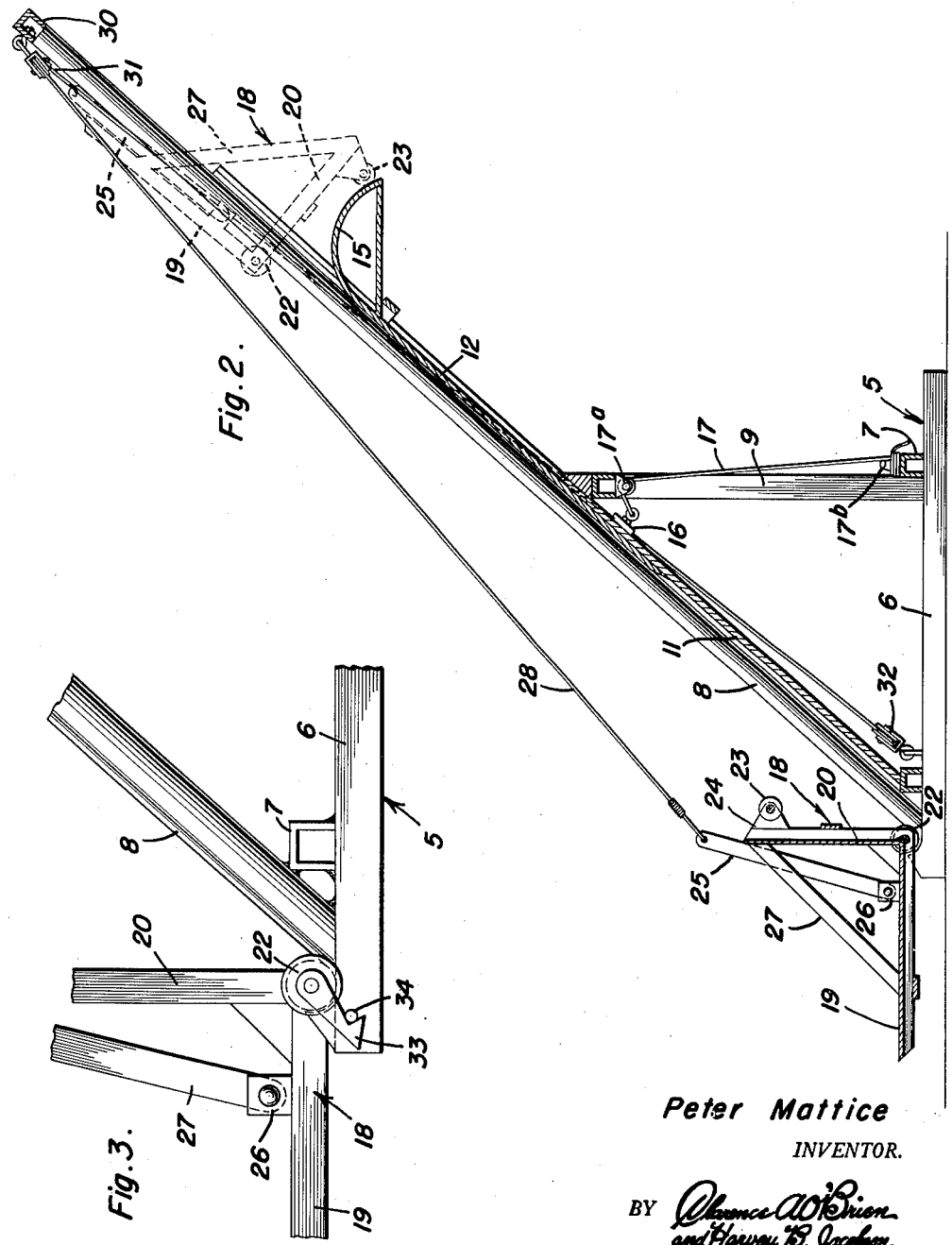

2,629,505

UNITED STATES PATENT OFFICE 2,629,505

HAY STACKER

Peter Mattice, Wells, Nev.

Application January 13, 1950, Serial No. 138,465

1 Claim. (Cl. 214—108)

The present invention relates to new and useful improvements in hay stackers for elevating hay for delivering it to the top of a stack or for loading the same on a vehicle and including an elevating fork for traveling on inclined tracks with means for dumping the load when the fork reaches a desired height.

An important object of the invention is to provide a vertically adjustable load dumping device whereby the load may be dumped at various levels.

A further object of the invention is to provide an elevating fork equipped with pivoted levers at each side and to which the hoisting cables are attached whereby the fork will be tilted upwardly after being loaded by the initial pulling action of the cables and for holding the fork in its tilted position while traveling upwardly on the track and the levers further serving to tilt the fork in a rearwardly inclined dumping position as the fork travels over the upper end of the load dumping member.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numberals refer to like parts throughout, and in which:

Figure 1 is a perspective view;

Figure 2 is a vertical sectional view; and

Figure 3 is an enlarged fragmentary side elevational view showing the locking dog holding the fork in its loading positon.

Referring now to the drawings in detail wherein for the purpose of illustration I have disclosed a preferred embodiment of the invention, the numeral 5 designates a base frame composed of a pair of side sills 6 rigidly connected to each other in spaced parallel relation by cross bars 7.

A pair of upwardly inclined tracks 8 are secured at their lower ends to the front ends of sills 6 and are supported in an upwardly inclined position by a brace frame structure rising from the rear portion of sills 6. The brace structure 9 includes a cross bar 10 at its upper portion and on which the upper end of a center track 11 is supported while the lower end of center track 11 is secured to the front cross bar 7.

The center track 11 includes a vertically extensible upper section 12 of substantially T-shape with a cross bar 13 at its upper portion sliding on guides 14 at the inner edges of tracks 8. A rearwardly curved neck 15 is formed at the upper end of extensible center track 12. Extensible center track section 12 is slidably held on fixed center track 11 by guides 16 extending downwardly at the side edges of extensible track 12 and under fixed track 11. The extensible track 12 is raised and lowered by means of a cable 17 attached to guides 16 and extending over a pulley 17a attached to cross bar 10 and downwardly to a cleat 17b attached to frame 5 to hold the extension track in its vertically adjusted position.

An elevating fork 18 includes spaced parallel forwardly projecting tines 19 and upwardly projecting rear tines 20 at the rear end of the fork positoned at right angles to tines 19. A shaft 21 extends transversely of the fork at the junction of tines 19 and 20 and on the ends of which grooved rollers 22 are journaled for traveling on tracks 8. A center roller 23 is journaled in a mounting 24 at the rear of the center vertical rear tine 20 for traveling on center track 11 and on the center extensible track 12.

A pair of levers 25 are pivoted at their lower ends to brackets 26 adjacent the rear ends of the tines 19 at the sides of the fork 18, the levers swinging between inclined guide strips 27. Hoisting cables 28 are attached to the upper ends of levers 25 and extend upwardly along tracks 8 over pulleys 29 attached to the cross head 30 at the upper ends of tracks 8, the cables then extending downwardly around pulleys 31 to pulleys 32 at the lower ends of tracks 8 and laterally toward one side of the device to a winch or other suitable hoisting apparatus (not shown).

A locking dog 33 is pivoted to one end of shaft 21 and engages a pin 34 at the front end of one of the sills 6 to lock the fork 18 in its lower loading position.

In the operation of the device, the fork 18 is locked in its lower position by dog 33 and hay loaded on the fork. Upon an initial pulling force on cables 28, while the fork remains locked, the levers 25 will swing rearwardly against the rear tines 20 at the sides of the fork 18 and tilt the fork rearwardly to rest center roller 23 on center track 11. Dog 33 is then released manually and cables 28 then pull the fork upwardly, the rollers 22 traveling on tracks 8 and roller 23 traveling on track 11 until the rearwardly curved neck 15 is reached, whereupon roller 23 travels rearwardly and downwardly on neck 15 and the fork swings rearwardly and downwardly, gradually on shaft 21 as its pivot into the dumping position shown in Figure 2 to dump the load. During the dumping movement of the fork the levers 25 swing against the tines 19 at the sides of the fork 18 to pull the tines upwardly and thereby limit dumping movement of said fork 18. This is a safety provision to prevent excessive swinging of the fork 18 if the roller 23 rides off the neck 15, which may obviously occur especially if the track 11 is contracted from the extended position shown in the drawings.

The extensible section 12 of the center track may be adjusted vertically to raise or lower the dumping neck 15 to variably predetermine the height at which the fork 18 shall dump.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a hay stacker, a pair of upwardly inclined laterally spaced coextensive tracks, a load hoisting and dumping fork having opposite sides, a pair of side rollers on said fork supporting the fork on said tracks for hoisting movement up said tracks, said fork being vertically swingable on said rollers from a loading to a hoisting position and overbalanced on said rollers when in hoisting position to swing downwardly between said pair of tracks into dumping position, a third track intermediate and parallel with the pair of tracks with an upper end spaced below the upper ends of said pair of tracks, a third roller on said fork engaged with said third track by swinging of said fork into hoisting position to maintain the fork in hoisting position to the upper end of the third track, said third roller riding off said upper end to release said fork for swinging into dumping position, a pair of pull cables at opposite sides of the pair of tracks, pulleys on the upper ends of the pair of tracks for supporting said cables, and a pair of levers pivoted to opposite sides of the fork and swingable against the fork to swing said fork into hoisting position and connected to said cables so that pull thereon will swing said levers and subsequently hoist said fork, said fork when swinging into dumping position engaging said levers so that said levers under pull thereon by said cables establish the maximum dumping position of the fork, and pairs of guides on the fork at opposite sides thereof between which said levers swing for guided movement.

PETER MATTICE.

REFERENCES CITED

The following references are of record in the file of this patent:

UNITED STATES PATENTS

| Number | Name | Date |
|---|---|---|
| 383,584 | Meyers | May 29, 1888 |
| 573,630 | Williams | Dec. 22, 1896 |
| 818,749 | Dain | Apr. 24, 1906 |
| 837,300 | Groo | Dec. 4, 1906 |
| 940,657 | Barnes | Nov. 23, 1909 |
| 1,115,241 | Peterson | Oct. 27, 1914 |
| 1,449,733 | Clausen | Mar. 27, 1923 |
| 1,468,606 | Ross | Sept. 18, 1923 |
| 1,993,081 | Anderson | Mar. 5, 1935 |
| 2,099,604 | Gunning | Nov. 16, 1937 |
| 2,387,198 | Twidwell | Oct. 16, 1945 |